(12) United States Patent
Bloom

(10) Patent No.: US 7,152,227 B1
(45) Date of Patent: Dec. 19, 2006

(54) AUTOMATED ASSESSMENT OF PROGRAMMING LANGUAGE COVERAGE BY ONE OR MORE TEST PROGRAMS

(75) Inventor: Andrew M. Bloom, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 685 days.

(21) Appl. No.: 10/464,084

(22) Filed: Jun. 17, 2003

(51) Int. Cl.
G06F 9/45 (2006.01)
(52) U.S. Cl. .................. 717/143; 717/131; 717/144
(58) Field of Classification Search ......... 717/124–167
See application file for complete search history.

(56) References Cited

U.S. PATENT DOCUMENTS

| | | | | |
|---|---|---|---|---|
| 5,259,766 A | * | 11/1993 | Sack et al. | 434/362 |
| 5,754,860 A | * | 5/1998 | McKeeman et al. | 717/124 |
| 5,910,895 A | * | 6/1999 | Proskauer et al. | 700/121 |
| 6,212,675 B1 | * | 4/2001 | Johnston et al. | 717/107 |
| 6,931,629 B1 | * | 8/2005 | Yount et al. | 717/126 |
| 7,062,760 B1 | * | 6/2006 | Tonouchi | 717/143 |
| 2003/0014734 A1 | * | 1/2003 | Hartman et al. | 717/125 |

OTHER PUBLICATIONS

London, Ralph L. "A Computer Program for Discovering and Proving Recognition Rules for Backus Normal Form Grammars", ACM Press 19th National Conference, 1964, pp. 1-7.*

* cited by examiner

Primary Examiner—Kakali Chaki
Assistant Examiner—William H. Wood
(74) Attorney, Agent, or Firm—LeRoy D. Maunu

(57) ABSTRACT

Method and apparatus for assessing coverage of production rules of a programming language by one or more test programs. A set of production rules that define the programming language is input, along with a test program. The production rules that are covered by the test program are determined and coverage of production rules by the test program is reported.

20 Claims, 9 Drawing Sheets

```
                                              ┌─ 206
    210 ┌─ INLINE_FILE := {INLINE_WORKAROUND}

252 ┌─ INLINE_WORKAROUND :=
              226 ┌─ ON_ENTER_PRODUCTION PRODUCTION_NAME ACTION_STATEMENT ;
              228 ┌─| ON_EXIT_PRODUCTION PRODUCTION_NAME ACTION_STATEMENT;
              230 ┌─| GLOBAL_SETTING ;
              232 ┌─| @VHDL
              234 ┌─| @VERILOG

242 ┌─ ACTION_STATEMENT :=
              IF_STATEMENT
              | DISALLOW

244 ┌─ IF_STATEMENT :=
              IF CONDITION ACTION_STATEMENT

CONDITION :=
              OWNER_IS_TYPE(TYPE_STRING)
              | IS_PARENT(PRODUCTION_NAME)
              | PRIOR_ITEM_IS(ITEM_STRING, #)

GLOBAL_SETTING :=
              GLOBAL_DISALLOW_SUBSTRING(STRING)
              | GLOBAL_SET_RESERVED_WORD (STRING)
```

FIG. 3

```
                              ╭─ 208
 production=INLINE_FILE
212 ╱ INLINE_WORKAROUND (Repeat 1)
   216 ╱ (choice 1 of 5: ON_ENTER_PRODUCTION)
         246 ╱ production=ACTION_STATEMENT ;
                     (choice 1 of 2:IF_STATEMENT)
                            production=CONDITION
                                    (choice 1 of 3:OWNER_IS_TYPE)
                                    (choice 2 of 3:IS_PARENT)
                                    (choice 3 of 3:PRIOR_ITEM_IS)
                     248 ╱ production=ACTION_STATEMENT (recurse 2)
                            (choice 1 of 2:IF_STATEMENT)
                                    production=CONDITION
                                            (choice 1 of 3:OWNER_IS_TYPE)
                                            (choice 2 of 3:IS_PARENT)
                                            (choice 3 of 3:PRIOR_ITEM_IS)
                            production=ACTION_STATEMENT (recurse 3 - terminate)
                     (choice 2 of 2:DISALLOW)
   218 ╱ (choice 2 of 5: ON_EXIT_PRODUCTION )
         production=ACTION_STATEMENT ;
                     (choice 1 of 2:IF_STATEMENT)
                            production=CONDITION
                                    (choice 1 of 3:OWNER_IS_TYPE)
                                    (choice 2 of 3:IS_PARENT)
                                    (choice 3 of 3:PRIOR_ITEM_IS)
                            production=ACTION_STATEMENT (recurse 2)
                                    (choice 1 of 2:IF_STATEMENT)
                                            production=CONDITION
                                                    (choice 1 of 3:OWNER_IS_TYPE)
                                                    (choice 2 of 3:IS_PARENT)
                                                    (choice 3 of 3:PRIOR_ITEM_IS)
                                    production=ACTION_STATEMENT (recurse 3 - terminate)
                     (choice 2 of 2:DISALLOW)
   220 ╱ (choice 3 of 5: GLOBAL_SETTING ;)
         production=GLOBAL_SETTING
                     (choice 1 of 2: GLOBAL_DISALLOW_SUBSTRING)
                     (choice 2 of 2: GLOBAL_SET_RESERVED_WORD)
   222 ╱ (choice 4 of 5: @VHDL)
   224 ╱ (choice 5 of 5: @VERILOG)
```

FIG. 4A

```
                                    ┌─ 208
214 ─╱─ INLINE_WORKAROUND (Repeat 2)
            (choice 1o f 5: ON_ENTER_PRODUCTION)
                    production=ACTION_STATEMENT ;
                            (choice 1 of 2:IF_STATEMENT)
                                    production=CONDITION
                                            (choice 1 of 3:OWNER_IS_TYPE)
                                            (choice 2 of 3:IS_PARENT)
                                            (choice 3 of 3:PRIOR_ITEM_IS)
                                    production=ACTION_STATEMENT (recurse 2)
                                            (choice 1 of 2:IF_STATEMENT)
                                                    production=CONDITION
                                                            (choice 1 of 3:OWNER_IS_TYPE)
                                                            (choice 2 of 3:IS_PARENT)
                                                            (choice 3 of 3:PRIOR_ITEM_IS)
                                                    production=ACTION_STATEMENT (recurse 3 - terminate)
                                            (choice 2 of 2:DISALLOW)
            (choice 2 of 5: ON_EXIT_PRODUCTION )
                    production=ACTION_STATEMENT ;
                            (choice 1 of 2:IF_STATEMENT)
                                    production=CONDITION
                                            (choice 1 of 3:OWNER_IS_TYPE)
                                            (choice 2 of 3:IS_PARENT)
                                            (choice 3 of 3:PRIOR_ITEM_IS)
                                    production=ACTION_STATEMENT (recurse 2)
                                            (choice 1 of 2:IF_STATEMENT)
                                                    production=CONDITION
                                                            (choice 1 of 3:OWNER_IS_TYPE)
                                                            (choice 2 of 3:IS_PARENT)
                                                            (choice 3 of 3:PRIOR_ITEM_IS)
                                                    production=ACTION_STATEMENT (recurse 3 - terminate)
                                            (choice 2 of 2:DISALLOW)
            (choice 3 of 5: GLOBAL_SETTING ;)
                    production=GLOBAL_SETTING
                            (choice 1 of 2: GLOBAL_DISALLOW_SUBSTRING)
                            (choice 2 of 2: GLOBAL_SET_RESERVED_WORD)
            (choice 4 of 5: @VHDL)
            (choice 5 of 5: @VERILOG)
```

FIG. 4B

```
                                    ┌─700
  702 ─┌INLINE_FILE := {INLINE_WORKAROUND} [test1.src 1,0] [test2.src 1,0]  ┐
  704 ─┌INLINE_WORKAROUND := [test1.src 1,0 / 4,0 / 5,0] [test2.src 1,0 / 3,0]  ┐
       │  706 ─┌ON_ENTER_PRODUCTION PRODUCTION_NAME ACTION_STATEMENT;     │
       │                                                  [test1.src 1,0] [test2.src 3,0]
       │  718 ─┌ON_EXIT_PRODUCTION PRODUCTION_NAME ACTION_STATEMENT;     │
       │  708 ─┌GLOBAL_SETTING; [test1.src 4,0 / 5,0] [test2.src 1,0]    │
       │       │@VHDL                                                     │
       │  720 ─┤@VERILOG                                                  │

710 ─┌ACTION_STATEMENT := [test1.src 2,1 / 2,36 ] [test2.src 4,2 / 5,6 / 6,6] │
       │    IF_STATEMENT [test1.src 2,1 / 2,36 ] [test2.src 4,2 / 5,6 / 6,6]    │
       │    | DISALLOW [test1.src 2,36] [test2.src 6,39]                        │

712 ─┌IF_STATEMENT := [test1.src 2,1 / 2,36 ] [test2.src 4,2 / 5,6 / 6,6]     │
       │    IF CONDITION ACTION_STATEMENT [test1.src 2,1 / 2,36 ] [test2.src 4,2 / 5,6 / 6,6] │

714 ─┌CONDITION := [test1.src 2,1 / 2,36 ] [test2.src 4,2 / 5,6 / 6,6]        │
       │    OWNER_IS_TYPE(TYPE_STRING) [test2.src 4,5]                           │
       │    | IS_PARENT(PRODUCTION_NAME) [test1.src 2,4]                         │
       │    | PRIOR_ITEM_IS(ITEM_STRING, #) [test2 5,9 / 6,11]                   │

716 ─┌GLOBAL_SETTING := [test1.src 4,0 / 5,0] [test2.src 1,0]                 │
       │    | GLOBAL_DISALLOW_SUBSTRING(STRING) [test2.src 1,0]                  │
       │    | GLOBAL_SET_RESERVED_WORD (STRING) [test1.src 4,0 / 5,0]            │
```

FIG. 7

AUTOMATED ASSESSMENT OF PROGRAMMING LANGUAGE COVERAGE BY ONE OR MORE TEST PROGRAMS

FIELD OF THE INVENTION

The present disclosure generally relates to assessing the extent to which one or more test programs exercise features of a programming language.

BACKGROUND

Software and hardware description languages are described by a set of rules or "productions" that define the syntax and grammar of the language. The rules are usually expressed in Backus-Naur form (BNF). The rules consist of a list of productions which describe the language. Developers of language tools (hardware and/or software) need to ensure the tools they are developing are fully tested under all conditions possible. For example, compilers and synthesizers need to be adequately tested to ensure that code is correctly compiled or synthesized and that the desired features of the language are fully supported.

A number of test programs may be constructed with the goal of covering all of the productions in as much depth as is practical. Generally, test programs can be constructed to test all of the productions, at least to some degree. However, to test all possible different code sequences derivable from a production may not practical if a very large number of code sequences are derivable from the production. Thus, determining whether a tool has been adequately tested with a given set of test programs may be difficult.

A system and method that address the aforementioned problems, as well as other related problems, are therefore desirable.

SUMMARY OF THE INVENTION

The disclosure describes various methods and apparatus for assessing coverage of production rules of a programming language by one or more test programs. A set of production rules that define the programming language is input, along with a test program. The production rules that are covered by the test program are determined and coverage of production rules by the test program is reported.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 3 illustrates an example set of productions of a language specification;

FIGS. 4A and 4B together illustrate an expanded tree of the set of productions from FIG. 3;

FIG. 7 illustrates an annotated version of the example set of productions in which the productions are highlighted to indicate test coverage by the first and second example test programs.

DETAILED DESCRIPTION

Figure 1:
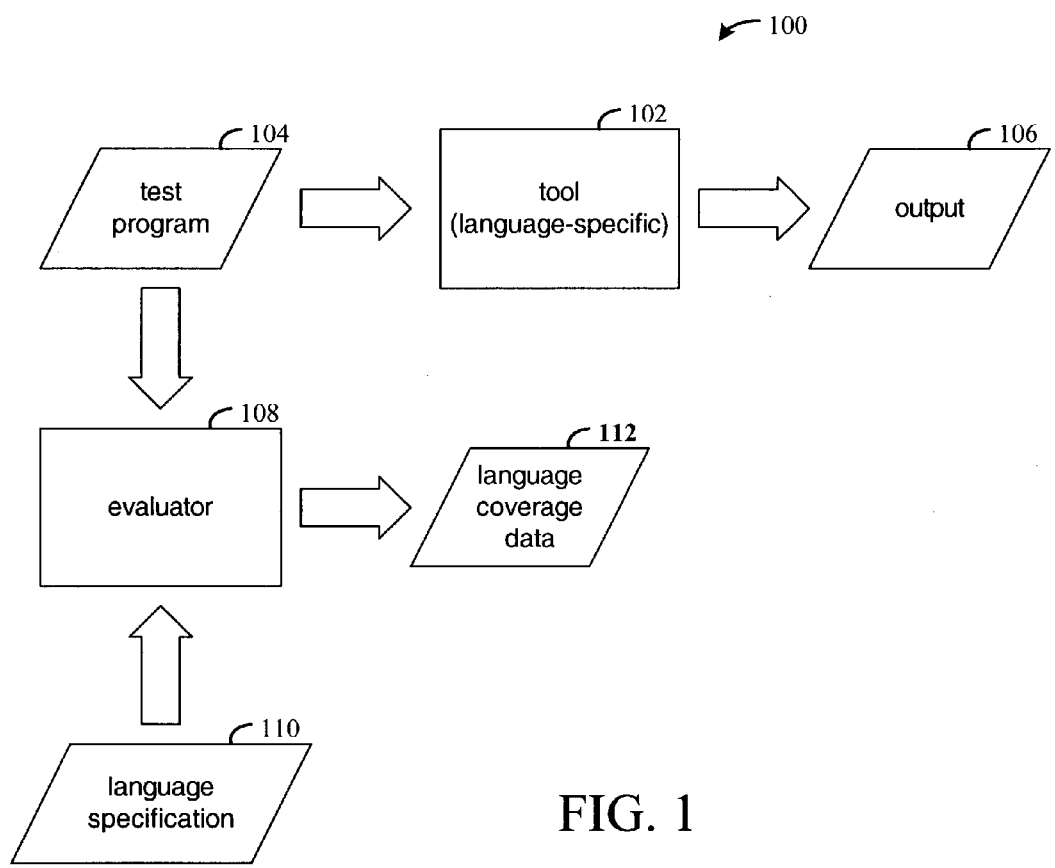
FIG. 1 is a block diagram of an arrangement for evaluating language coverage by a test program.

FIG. 1 is a block diagram of an arrangement 100 for evaluating language coverage by a test program. Tool 102 is an example tool for processing program code of a particular language. For example, the tool may be a compiler for a programming language such as C, C++, Pascal and others, a synthesizer for a hardware description language (HDL) such as VHDL, Verilog, Abel and others, or a tool for developing Web pages and Web applications using languages such as HTML, Java and others. In one manner of testing whether the tool meets a set of requirements, a test program 104 is input to the tool, and the tool generates output 106. If the tool is a compiler, machine language code may the output. The output may then be compared to a set of expected results in order to verify whether the tool correctly processed the test program.

Evaluator 108 analyzes the test program 104 relative to language specification 110 and generates data 112 that indicates which features of the language are exercised by the test program. In one embodiment, the language specification is set forth as a collection of productions and subproductions, for example, in Backus-Naur form. The evaluator generally compares those productions and subproductions that derive the test program to a selected finite set of possible combinations of productions and subproductions.

In one embodiment, the coverage data generated by the evaluator indicates which productions and subproductions derive the test program. In a further embodiment, the productions and subproductions are listed, and each production and subproduction is color coded to indicate the extent of coverage. For example, a green coding indicates that the production and all its subproductions derive one or more parts of the program. A yellow coded production indicates that some but not all of the production's subproductions derive one or more parts of the program. A red coded production indicates that none of the subproductions of a production derive any part of the program.

In another embodiment, the listing of productions and subproductions is annotated with data that reference locations in the test program where the code derived by the production/subproduction is found. The annotations may further indicate the name of the source file in which the test program is found.

In still another embodiment, the evaluator may analyze multiple test programs for test coverage and output data that indicates the collective coverage of the language by the programs. Both color coding and annotating of productions and subproductions may be used to indicate the collective coverage.

Figure 2:
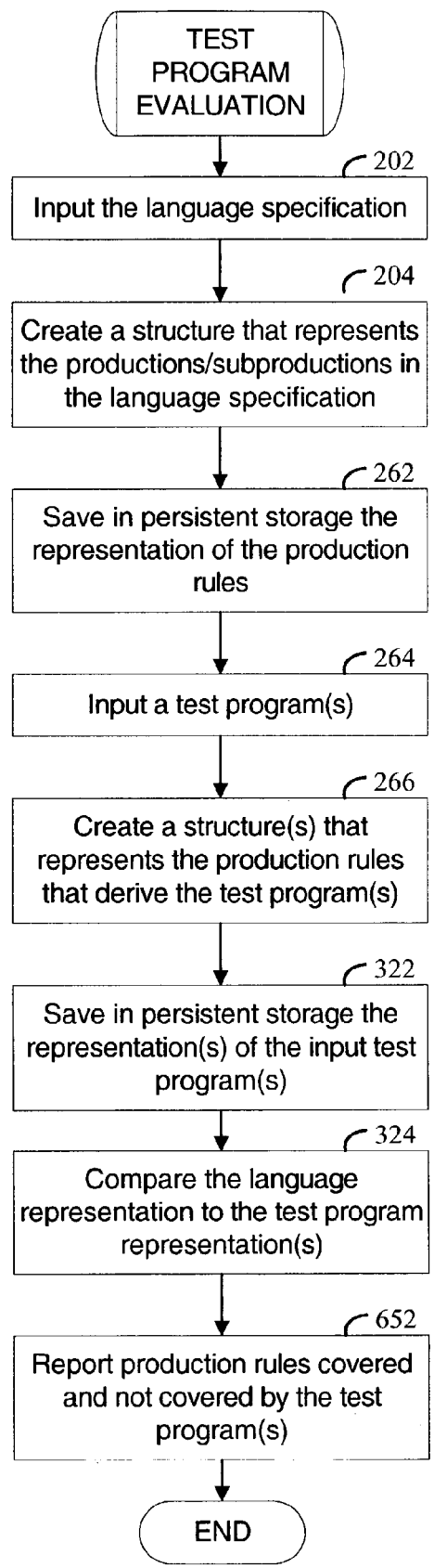
FIG. 2 is a flowchart of an example process for evaluating language coverage by a test program.

FIG. 2 is a flowchart of an example process for evaluating language coverage by a test program in accordance with various embodiments of the invention. The process of FIG. 2 is described in conjunction with processing of the example productions and test programs in FIGS. 3–7. A specification of the language is input (step 202), and a data structure is created to represent the productions and subproductions of the language (step 204). FIG. 3 illustrates an example set of productions 206 of a language specification, and FIGS. 4A and 4B together illustrate an expanded tree 208 generated from the set of productions.

The example productions and subproductions of FIG. 3 are specified in BNF. The productions and subproductions are parsed and the expanded tree structure of FIGS. 4A and 4B is created. For each top-level production a subtree is created. For example, from the top-level production 210 in FIG. 3, the subtree that is generated includes a first branch that begins with a first repetition of the subproduction 212 INLINE_WORKAROUND and a second branch that begins with a second repetition of the subproduction 214 INLINE_WORKAROUND. The indentation in FIGS. 4A and 4B represents branches in the tree structure. For example, under production 212, there are branches 216, 218, 220, 222, and 224, which represent the subproductions 226, 228, 230, 232, and 234, respectively.

In one embodiment, the user may specify the number of levels to which the productions and subproductions are expanded and the number of repetitions of productions and subproductions. The numbers of levels and repetitions may be chosen with the goal of verifying coverage of productions with statements of certain complexity balanced against limiting possible repetitive and redundant verification. For example, a statement in a test program may be recursively derived from the ACTION_STATEMENT and IF_STATEMENT productions 242 and 244 to a certain number of levels depending the complexity of the statement. With an example recurse level set at 2, the expansion of the ACTION_STATEMENT production is limited to the branches 246 and 248. The user may, for test-specific reasons, decide that this level of coverage verification is sufficient.

The number of times that productions and subproductions from the language specification are represented in the expanded tree may also be specified by the user. Because multiple statements in a test program may be derived from the same production, the user may want to verify coverage of the production by some number of statements. For example, the grammar 206 permits multiple derivations from the INLINE_WORKAROUND production 252. However, the expanded tree of FIGS. 4A and 4B limits the number of repetitions of the production to 2 (branches 212 and 214). It can be seen that branches 212 and 214 are identical. As the example is further developed, it will be seen that branch 212 will be annotated with the first derivation from a source test program, and branch 214 will be annotated with the second derivation from the source test program. Any further derivations in the source are not tracked.

Returning now to FIG. 2, the expanded tree structure of FIGS. 4A and 4B may be saved in persistent storage (step 262) in order to eliminate having to recreate the expanded tree for subsequent evaluations.

One or more test programs to be evaluated are input (step 264), and tree structures are generated to represent the productions that derive the statements in the program(s) (step 266). It will be appreciated that compiler technology may be adapted to generate a tree representation of the productions that are followed in parsing the program.

Figures 5A, 5B:
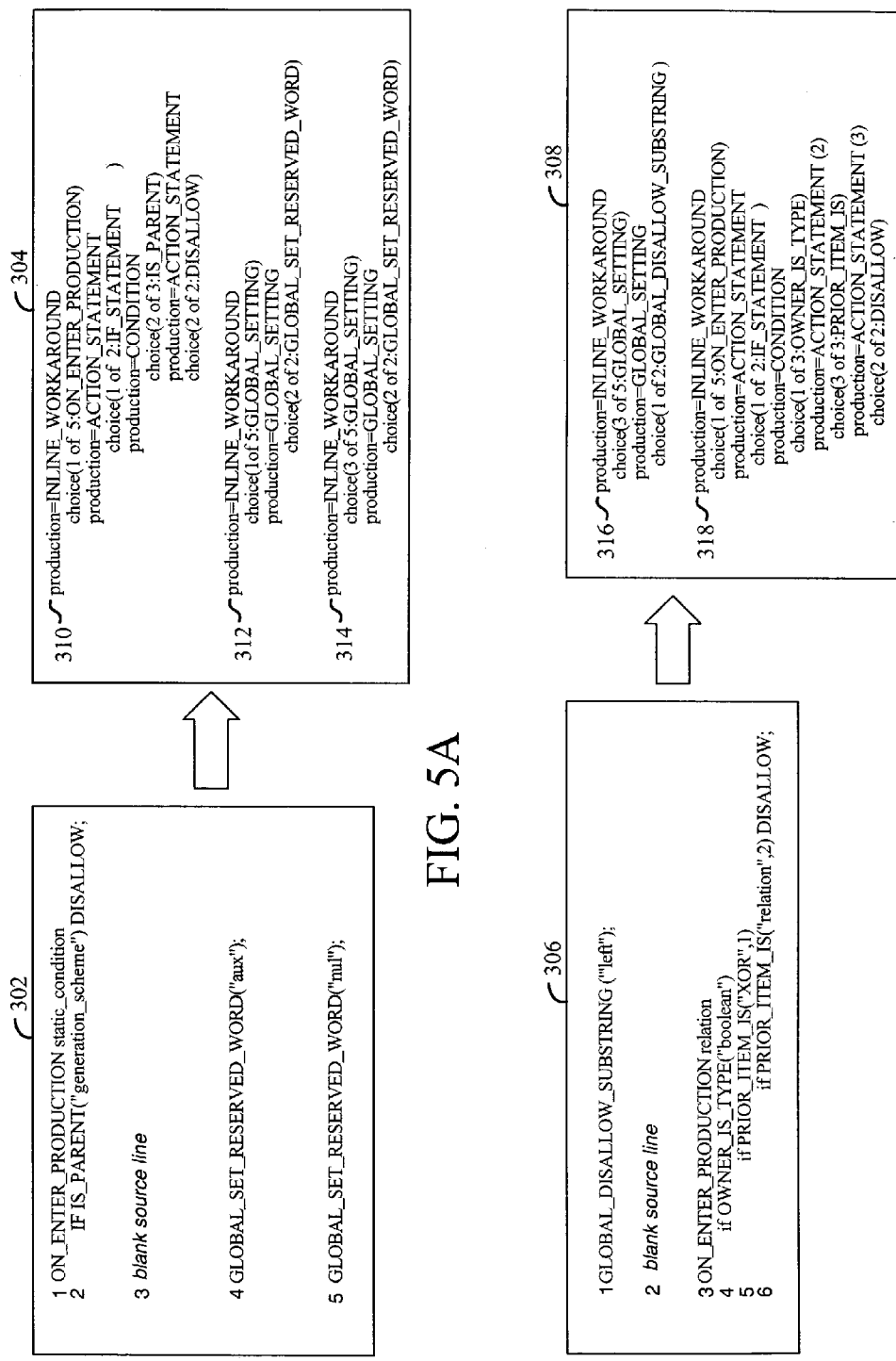
FIG. 5A illustrates the translation of a first example test program into a tree of productions and subproductions that derive the first program.
FIG. 5B illustrates the translation of a second example test program into a tree of productions and subproductions that derive the second program.

FIG. 5A illustrates the translation of a first example test program 302 into a tree 304 of productions and subproductions that derive the first program, and FIG. 5B illustrates the translation of a second example test program 306 into a tree 308 of productions and subproductions that derive the second program. Program 302 includes 5 lines of source code that are numbered 1–5, and program 306 includes 6 lines of source code numbered 1–6. The lines of source code are generally aligned with the branches of the tree structure that are generated to represent the productions that derive the code. For example, lines 1 and 2 of program 302 are aligned with branch 310, line 4 is aligned with branch 312, and line 5 is aligned with branch 314. From FIG. 5B, line 1 of program 306 is aligned with branch 316, and the code that begins on line 3 is aligned with branch 318.

Returning now to FIG. 2, the representation of the productions that derive the input test program(s) (tree structures 304 and 308) may be saved in persistent storage (step 322) for subsequent analysis either alone or in combination with other programs. The process then proceeds to compare (step 324) the program productions to the representation of the language specification (e.g., expanded tree structure 208).

Figure 6A:
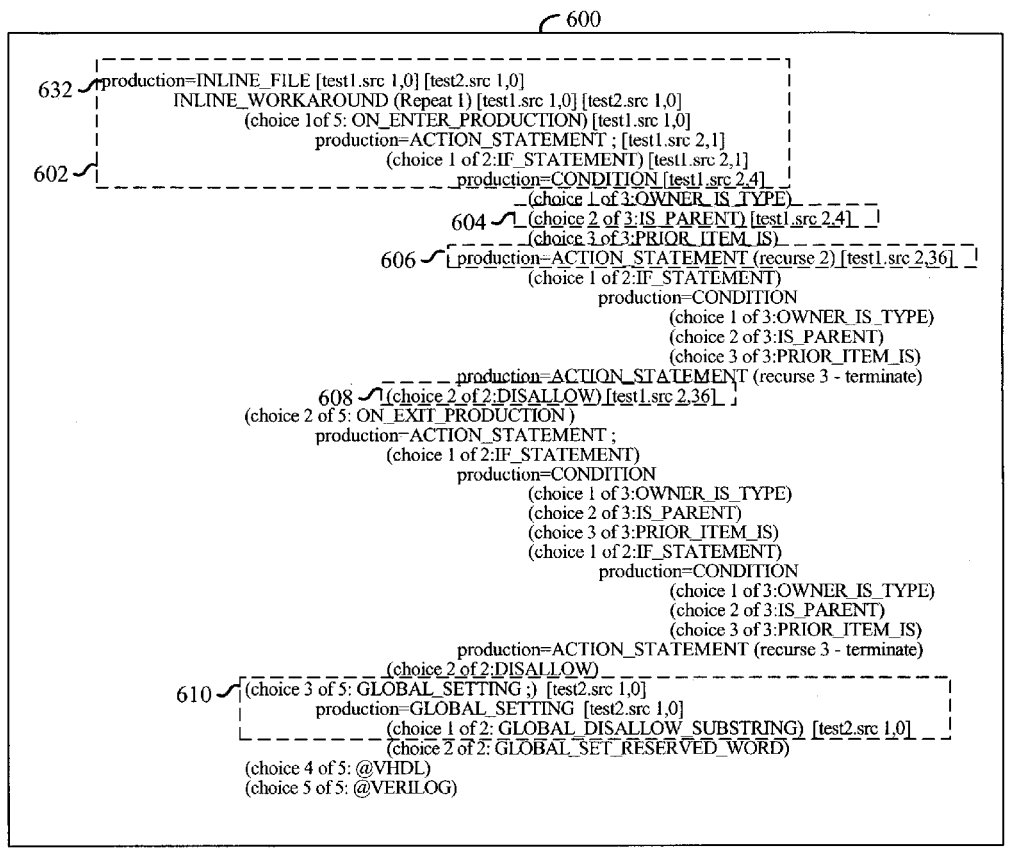
FIGS. 6A and 6B together illustrate an annotated version of the expanded tree of the set of productions, with productions and subproductions highlighted to indicate test coverage by the first and second example test programs.
Figure 6B:
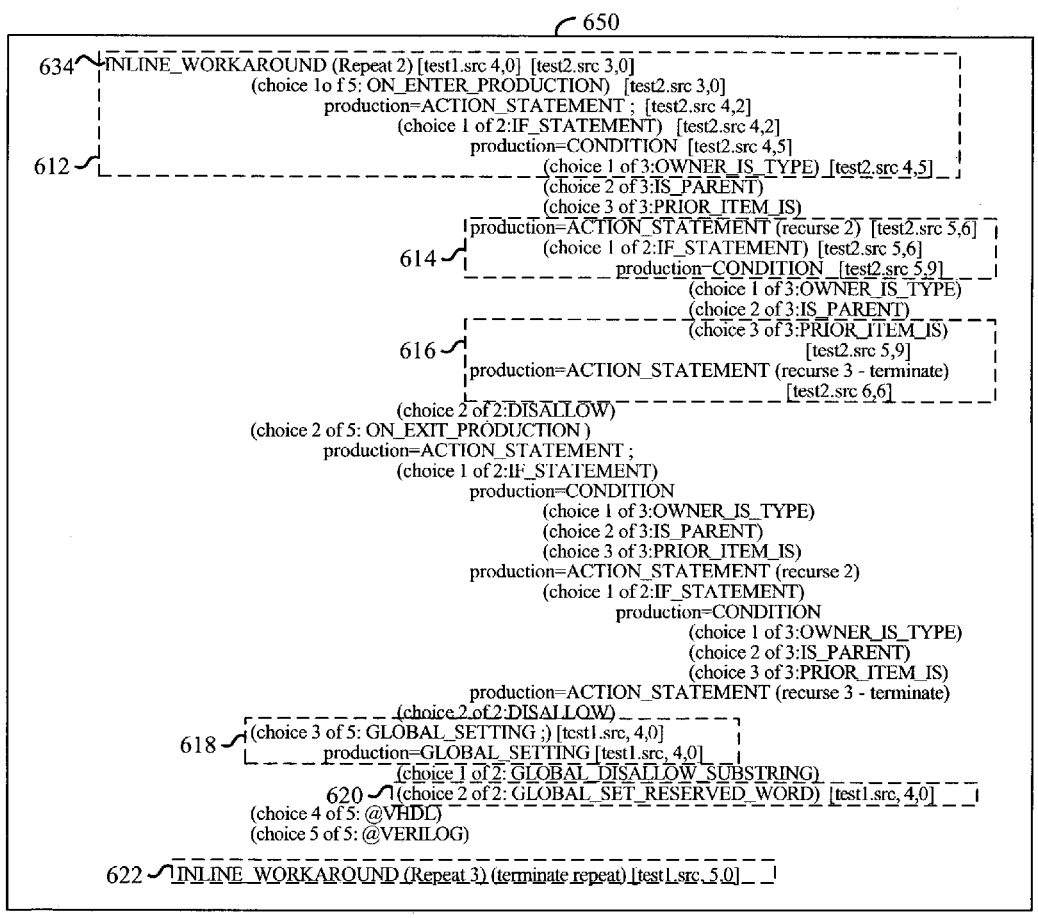

In one embodiment, the comparison involves a comparison of the branches in the program productions to the branches in the expanded BNF tree. FIGS. 6A and 6B together illustrate an annotated version 600 of the expanded tree (FIGS. 4A and 4B) of the set of productions, with productions and subproductions highlighted to indicate test coverage by the first and second example test programs. The annotations and highlighting are further used to illustrate the comparison of the program production derivations to the expanded BNF tree.

For example, the production=INLINE_WORKAROUND in branch 310 in the program structure 304 (FIG. 5A) matches the INLINE_WORKAROUND production 212 (FIG. 4A). The matching tree branches are both highlighted and annotated to inform the user of the coverage. For example, blocks 602, 604, 606, and 608 are drawn to illustrate which branches in the tree structure may be highlighted to indicate a match of the program tree branch 310 (FIG. 5A). Blocks 602 and 610 include the productions that derive the statement on line 1 of input test program 306 (FIG. 5B). Blocks 612, 614, 616, 618, 620, and 622 (FIG. 6B) include the productions that derive the remainder of programs 302 and 304. The highlighting may consist of displaying the text in the block with background and/or foreground colors (e.g., black on yellow) that are different from colors used to display non-matching branches in the tree structure (e.g., black on white).

The branches in tree structure 600 that match the program tree structure 304 are annotated to indicate the file name of the input test program and the line number and line-relative character offset of the statements in the input test program derived from the productions listed in the tree structure. For example, the branch, production=INLINE_FILE in tree structure 600 is annotated with [test1.src 1, 0][test2.src 1,0], which indicates that this production derives statements in both input test program 302 (file name test1.src) and test program 306 (file name test2.src), and that the statements both begin on line 1, character offset 0.

From the example it may be observed that limiting the expansion of the input productions and subproductions to 2 repetitions (INLINE_WORKAROUND repeated twice) means that complete derivations of some of the code from input test program 302 is not specified in expanded tree structure 600. For example, derivation of the statement on line 5 of test program 302 begins with the top-level production INLINE_WORKAROUND. However, the two branches 632 and 634 are annotated as deriving the statements on lines 1 and 4 of test program 302, and branch 622 terminates expansion of the tree structure at two repetitions.

Thus, the additional productions and subproductions that derive the statement on line 5 are not present in the expanded tree 600.

Returning now to FIG. 2, the process reports the user coverage of the productions and subproductions by the input test programs (step 652). In one embodiment, the coverage is reported by way of a color-coded and annotated listing of the input set of productions and subproductions. The color coding indicates the level of coverage of the various production and subproductions, and the annotations indicate the file names, line numbers, and character offsets of statements derived by the productions.

FIG. 7 illustrates an example version 700 of the example set of productions in which the productions are highlighted and annotated to indicate test coverage by the test programs 302 and 306. In an example color-coded highlighting of productions, yellow may be used to indicate productions that are partially covered, green to indicate to full coverage, and red to indicate no coverage. Blocks with different line characteristics are used to represent the different colors in FIG. 7. Blocks with dashed lines (702 and 704) represent yellow highlighting or partial coverage, blocks with dotted lines (706, 708, 710, 712, 714, and 716) represent green highlighting or full coverage, and blocks with dash-dot-dash-dot-lines (718 and 720) represent red highlighting or no coverage.

The coverage of the productions by the test program may be determined from the annotated expanded tree structure, for example, structure 600. If, collectively across all repetitions of a production in the expanded tree structure, all possible derivations of the production are annotated with a source statement, then the production is completely covered. If at least one of the subproductions of a production is not annotated under any of the repetitions of the production, and at least one other of the subproductions under the production is annotated, then the production is partially covered. If no repetition of a particular production or subproduction is annotated, then the production/subproduction is not covered.

It will be appreciated that the various embodiments of the invention allow a tester to reduce the time expended in testing a tool by minimizing the number of test cases needed to achieve a desired level of coverage. For example, duplicate test cases may be identified and removed thereby eliminating extra time spent running duplicative tests. Duplicate tests may be identified by saving the coverage information as reported to the user (step 652), and comparing coverage information between test cases. The difference in coverage between test cases may be reported to the user to assist in deciding whether a test case should be retained.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for analyzing the effectiveness test programs directed at language-processing tools. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for assessing coverage of production rules of a programming language by at least one test program, comprising:
   inputting a set of production rules that define the programming language;
   inputting a test program;
   determining the production rules that are covered by the test program;
   reporting coverage of the set of production rules by the test program; and
   annotating reported production rules with data that identify positional information relative to code in the test program derived from the reported production rules.

2. The method of claim 1, further comprising:
   determining for each production rule one of a plurality of levels of coverage by the test program, wherein the levels of coverage include fully covered, partially covered, and not covered; and
   reporting in association with each production rule information that indicates the determined level of coverage.

3. The method of claim 2, further comprising color-coding the information that indicates the determined level of coverage of a production rule.

4. The method of claim 1, further comprising:
   inputting a plurality of test programs;
   determining the production rules that are covered by the test programs; and
   reporting collective coverage of the set of production rules by the test programs.

5. The method of claim 4, further comprising:
   identifying production rules covered by two or more of the plurality of test programs; and
   reporting each production rule covered by two or more of the plurality of test programs.

6. The method of claim 4, further comprising:
   determining for each production rule one of a plurality of levels of coverage by the plurality of test programs, wherein the levels of coverage include fully covered, partially covered, and not covered; and
   reporting in association with each production rule information that indicates the determined level of coverage.

7. The method of claim 6, further comprising color-coding the information that indicates the determined level of coverage of a production rule.

8. An apparatus for assessing coverage of production rules of a programming language by at least one test program, comprising:
   means for inputting a set of production rules that define the programming language;
   means for inputting a test program;
   means for determining the production rules that are covered by the test program;
   means for reporting coverage of the set of production rules by the test program; and
   means for annotating reported production rules with data that identify positional information relative to code in the test program derived from the reported production rules.

9. A computer-implemented method for assessing coverage of production rules of a programming language by at least one test program, comprising:
   inputting a set of production rules that define the programming language;
   generating a first tree of nodes that represents the set of production rules;
   inputting a test program;

generating a second tree of nodes that represents production rules that derive the test program;
comparing nodes of the first tree to nodes of the second tree;
displaying the first tree with information associated with the nodes that indicates coverage of the set of production rules by the test program; and
annotating nodes in the first tree with data that identify positional information relative to code in the test program derived from the reported production rules.

10. The method of claim 9, further comprising:
determining for each node in the first tree one of a plurality of levels of coverage by the test program, wherein the levels of coverage include fully covered, partially covered, and not covered; and
displaying in association with each node in the first tree information that indicates the determined level of coverage.

11. The method of claim 10, further comprising color-coding the information that indicates the determined level of coverage.

12. The method of claim 9, further comprising:
inputting a plurality of test programs;
generating respective trees of nodes that represent production rules that derive the plurality of test programs;
comparing nodes of the first tree to nodes of the plurality of trees; and
displaying the first tree with information associated with the nodes that indicates coverage of the set of production rules by the plurality of test programs.

13. The method of claim 12, further comprising:
identifying nodes of the first tree that correspond to nodes of two or more of the plurality of trees; and
displaying information in association with each node of the first tree covered by two or more of the plurality of test programs.

14. The method of claim 12, further comprising:
determining for each node in the first tree one of a plurality of levels of coverage by the plurality of test programs, wherein the levels of coverage include fully covered, partially covered, and not covered; and
displaying in association with each node in the first tree information that indicates the determined level of coverage.

15. The method of claim 14, further comprising color-coding the information that indicates the determined level of coverage of a node in the first tree.

16. The method of claim 9, wherein generating the first tree comprises generating for recursive production rules a selected number of levels in the tree.

17. The method of claim 9, wherein nodes in the first tree are interconnected and branches formed, and generating the first tree comprises replicating selected branches in the tree a selected number of times.

18. An apparatus for assessing coverage of production rules of a programming language by one or more test programs, comprising:

means for inputting a set of production rules that define the programming language;
means for generating a first tree of nodes that represents the set of production rules;
means for inputting a test program;
means for generating a second tree of nodes that represents production rules that derive the test program;
means for comparing nodes of the first tree to nodes of the second tree;
means for displaying the first tree with information associated with the nodes that indicates coverage of the set of production rules by the test program; and
means for annotating nodes in the first tree with data that identify positional information relative to code in the test program derived from the reported production rules.

19. An article of manufacture for assessing coverage of production rules of a programming language by a test program, comprising:
a computer-readable medium configured with instructions for causing a computer to perform the steps of,
inputting a set of production rules that define the programming language;
inputting a test program;
determining the production rules that are covered by the test program;
reporting coverage of the set of production rules by the test program; and
annotating reported production rules with data that identify positional information relative to code in the test program derived from the reported Production rules.

20. An article of manufacture for assessing coverage of production rules of a programming language by a test program, comprising:
a computer-readable medium configured with instructions for causing a computer to perform the steps of,
inputting a set of production rules that define the programming language;
generating a first tree of nodes that represents the set of production rules;
inputting a test program;
generating a second tree of nodes that represents production rules that derive the test program;
comparing nodes of the first tree to nodes of the second tree;
displaying the first tree with information associated with the nodes that indicates coverage of the set of production rules by the test program; and
annotating nodes in the first tree with data that identify positional information relative to code in the test program derived from the reported production rules.

* * * * *